United States Patent
Ku et al.

(10) Patent No.: US 10,007,394 B2
(45) Date of Patent: Jun. 26, 2018

(54) APPLICATIONS PRESENTATION METHOD AND SYSTEM OF MOBILE TERMINAL

(71) Applicant: Samsung Electronics Co., Ltd., Gyeonggi-do (KR)

(72) Inventors: Jaesung Ku, Gyeonggi-do (KR); Joohyun Kim, Gyeonggi-do (KR); Jongsang Won, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 433 days.

(21) Appl. No.: 14/200,638

(22) Filed: Mar. 7, 2014

(65) Prior Publication Data

US 2014/0282234 A1 Sep. 18, 2014

(30) Foreign Application Priority Data

Mar. 14, 2013 (KR) ........................ 10-2013-0027157

(51) Int. Cl.
*G06F 3/0481* (2013.01)
*G06F 3/0482* (2013.01)
(Continued)

(52) U.S. Cl.
CPC ........ *G06F 3/04817* (2013.01); *G06F 3/0482* (2013.01); *G06F 3/04842* (2013.01);
(Continued)

(58) Field of Classification Search
CPC . G06F 3/04817; G06F 3/0482; G06F 3/04842
See application file for complete search history.

(56) References Cited

U.S. PATENT DOCUMENTS

| 6,092,076 A | 7/2000 | McDonough et al. |
| 6,879,962 B1 * | 4/2005 | Smith .................. G06Q 10/025 705/1.1 |

(Continued)

FOREIGN PATENT DOCUMENTS

| EP | 1 703 382 A1 | 9/2006 |
| EP | 2 523 436 A1 | 11/2012 |

(Continued)

OTHER PUBLICATIONS

Japanese Search Report dated Dec. 5, 2017.

*Primary Examiner* — Rashawn N Tillery
(74) *Attorney, Agent, or Firm* — Cha & Reiter, LLC.

(57) ABSTRACT

An applications presentation method and system is provided, the method and system including displaying, a map on a display when a map application is executed, the map scaled to a location range, searching via a processor for installed applications having location information corresponding to the location range among a plurality of applications stored in the mobile terminal, transmitting information identifying at least the location range and the installed applications to an application provision server, receiving information on non-installed applications having the location information corresponding to the location range from the application provision server, and displaying icons including icons of the installed applications and icons of the non-installed applications on the map.

26 Claims, 9 Drawing Sheets

(51) Int. Cl.
    *G06F 3/0484*     (2013.01)
    *H04W 4/02*     (2018.01)
    *H04W 4/00*     (2018.01)
    *G06F 8/61*     (2018.01)

(52) U.S. Cl.
    CPC .............. *G06F 8/61* (2013.01); *H04W 4/001* (2013.01); *H04W 4/003* (2013.01); *H04W 4/02* (2013.01)

(56) References Cited

U.S. PATENT DOCUMENTS

| | | | |
|---|---|---|---|
| 6,983,203 B1 | 1/2006 | Wako | |
| 2002/0191029 A1* | 12/2002 | Gillespie | G06F 3/04817 715/810 |
| 2004/0090950 A1* | 5/2004 | Lauber | H04Q 9/00 370/352 |
| 2006/0212537 A1 | 9/2006 | Hans et al. | |
| 2008/0040678 A1* | 2/2008 | Crump | G06F 3/0481 715/763 |
| 2008/0239902 A1 | 10/2008 | Hirai | |
| 2008/0320419 A1* | 12/2008 | Matas | G01C 21/20 715/863 |
| 2010/0309149 A1* | 12/2010 | Blumenberg | G06F 3/04883 345/173 |
| 2011/0018827 A1 | 1/2011 | Wang et al. | |
| 2011/0047509 A1* | 2/2011 | Arrasvuori | G01C 21/3673 715/815 |
| 2011/0113423 A1 | 5/2011 | Yamamoto et al. | |
| 2012/0042036 A1* | 2/2012 | Lau | G06F 8/61 709/217 |
| 2012/0096455 A1* | 4/2012 | Katsumata | G06F 9/45558 717/177 |
| 2012/0159357 A1* | 6/2012 | Lim | G01C 21/367 715/760 |
| 2012/0166281 A1 | 6/2012 | Sartipi | |
| 2012/0229505 A1 | 9/2012 | Kuga | |
| 2012/0323898 A1 | 12/2012 | Kumar et al. | |
| 2013/0047119 A1* | 2/2013 | Lee | G06F 3/04883 715/800 |
| 2013/0050131 A1* | 2/2013 | Lee | G08G 1/09626 345/174 |
| 2013/0063278 A1* | 3/2013 | Prosser | G01F 23/74 340/870.02 |
| 2013/0332886 A1* | 12/2013 | Cranfill | G06F 3/0482 715/835 |
| 2013/0346872 A1* | 12/2013 | Scott | G06F 17/3064 715/738 |

FOREIGN PATENT DOCUMENTS

| | | |
|---|---|---|
| JP | 2008-90902 A | 4/2008 |
| JP | 2011-28560 A | 2/2011 |
| JP | 2011-134294 A | 7/2011 |
| KR | 10-2010-0050102 A | 5/2010 |
| KR | 10-2012-0067830 A | 6/2012 |
| KR | 10-2012-0133875 A | 12/2012 |
| WO | 2012/174458 A2 | 12/2012 |

* cited by examiner

APPLICATIONS PRESENTATION METHOD AND SYSTEM OF MOBILE TERMINAL

CROSS REFERENCE TO RELATED APPLICATION

This application claims the benefit under 35 U.S.C. § 119(a) of a Korean patent application filed on Mar. 14, 2013 in the Korean Intellectual Property Office and assigned Serial No. 10-2013-0027157, the entire disclosure of which is hereby incorporated by reference.

TECHNICAL FIELD

The present disclosure relates to an applications presentation method and system of a mobile terminal and, in particular, to a method and system for presenting the location-based applications installed and/or capable of being installed in association with locations on the map.

BACKGROUND

With the advance of information communication and semiconductor technologies, the popularity and use of mobile terminals have increased rapidly. The mobile terminal has become an essential part of modern life as a means of providing the user with various functions. Examples of the functions include voice telephony, still and motion picture shooting, broadcast reception, internet access, and map service functions. The map service function is capable of providing the user with geographical information in a given area in the form of two-dimensional or three-dimensional image.

Mobile terminals are also designed to download various types of applications from an application provision server and install the download applications. For example, the mobile terminal user may download and install a banking application, restaurant application, and cinema application for bank account transfer, restaurant menu checking and reservation, and film ticket booking, etc. and acquiring detailed information on various topics.

However, the current mobile terminals lack in interoperability between the map service function and other applications. For example, in order to check the detailed information on a certain building (bank, restaurant, department store, etc.) located on the map displayed by a map service application, the user has to laboriously execute another application designed to provide the detailed information on the corresponding building. Furthermore, if the application providing the information on the building is not installed in the mobile terminal, the user has to burdensomely access an application provision server to download and install the corresponding application.

SUMMARY

The present disclosure provides a method and system of a mobile terminal that is capable of providing information on the applications in association with the position located on the map.

Also, the present disclosure provides an applications presentation method and system of a mobile terminal that is capable of executing or installing the applications corresponding to a position located on the map.

Also, the present disclosure provides an applications presentation method and system of a mobile terminal that is capable of presenting the location-based menus of the executable applications in association with the position located on the map.

In accordance with an aspect of the present disclosure, an applications presentation method of a mobile terminal is provided. The applications presentation method includes displaying, a map on a display when a map application is executed, the map scaled to a location range, searching via a processor for installed applications having location information corresponding to the location range among a plurality of applications stored in the mobile terminal, transmitting information identifying at least the location range and the installed applications to an application provision server, receiving information on non-installed applications having the location information corresponding to the location range from the application provision server, and displaying icons including icons of the installed applications and icons of the non-installed applications on the map.

In accordance with another aspect of the present disclosure, an electronic device for presenting applications is provided. The electronic device comprises a display configured to display a map application, and a processor configured to: search for installed applications having location information corresponding to the location range among a plurality of applications stored in the electronic device, transmit information identifying at least the location range and the installed applications to an application provision server; receive information on non-installed applications having the location information corresponding to the location range from the application provision server; and display icons on the map, the icons including icons of the installed applications and icons of the non-installed applications.

In accordance with another aspect of the present disclosure, an applications presentation method of a mobile terminal is provided. The applications presentation method includes displaying a map on a display in response to a map display request, and displaying icons of applications having location information corresponding to a location range of the displayed map, wherein the applications comprise applications installed in the mobile terminal, and non-installed applications capable of being installed in the mobile terminal.

In accordance with still another aspect of the present disclosure, a computer-readable storage medium storing a program for executing an applications presentation method of a mobile terminal is provided. The applications presentation method includes displaying a map on a display in response to a map display request, and displaying icons of applications having location information corresponding to a location range of the displayed map, wherein the applications comprise applications installed in the mobile terminal, and non-installed applications capable of being installed in the mobile terminal.

DETAILED DESCRIPTION

Example embodiments of the present disclosure are described with reference to the accompanying drawings in detail. The same reference numbers may be used throughout the drawings to refer to the same or like parts. Detailed descriptions of well-known functions and structures incorporated herein may be omitted to avoid obscuring the subject matter of the present disclosure.

The specification and drawings are to be regarded in an illustrative rather than a restrictive sense in order to help understanding of the present disclosure. It is obvious to those skilled in the art that various modifications and changes can be made thereto without departing from the disclosure.

In the following description, the mobile terminal may be any of various types of terminals equipped with message transmission/reception functionality, such as a cellular communication terminal, smartphone, tablet Personal Computer (PC), hand-held PC, Portable Multimedia Player (PMP), Personal Digital Assistant (PDA), or laptop PC, etc.

Figure 1:
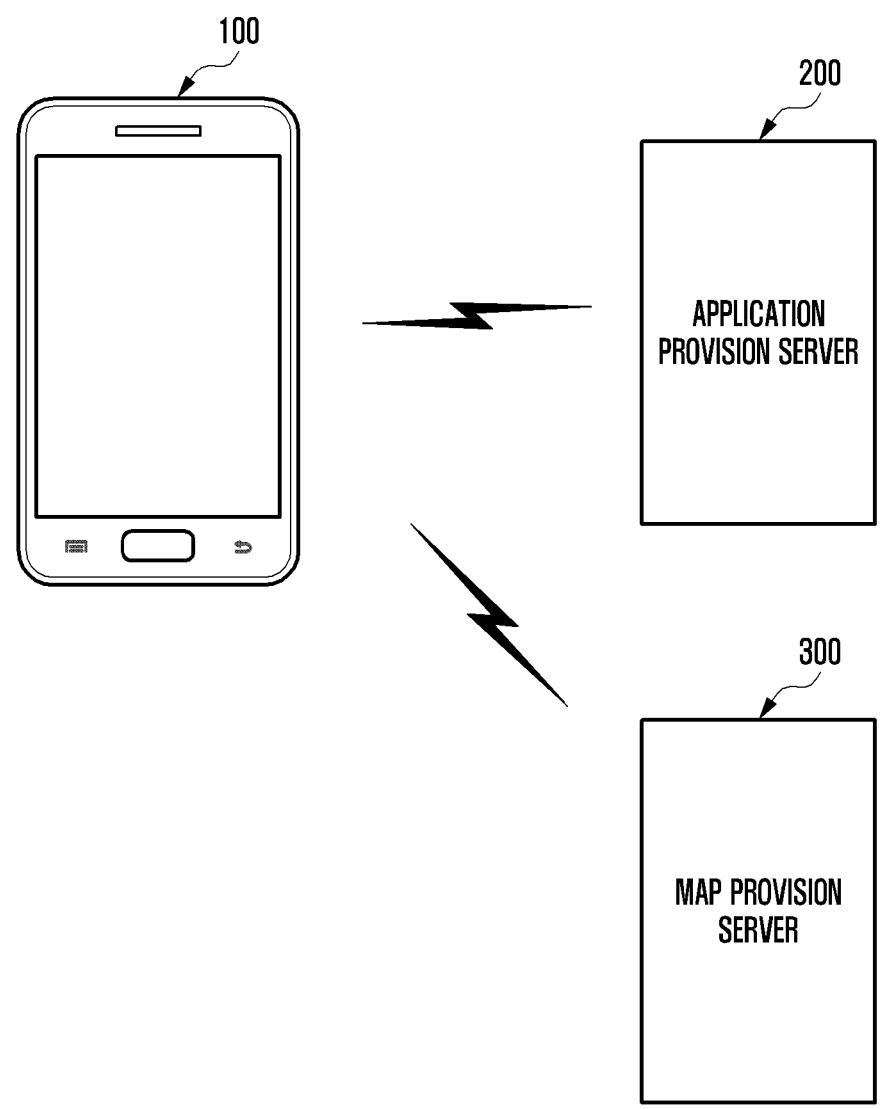
FIG. 1 is a schematic diagram illustrating an applications presentation system according to an embodiment of the present disclosure.

FIG. 1 is a schematic diagram illustrating an applications presentation system according to an embodiment of the present disclosure.

Referring to FIG. 1, the applications presentation system according to an embodiment of the present disclosure includes a mobile terminal 100, an application provision server 200, and a map provision server 300.

The map provision server 300 provides map data and a map data update service. The map data is the image data for proving geographical information in a two-dimensional ("2D") or three-dimensional ("3D") formats on the screen of the mobile terminal 100. The map data includes a plurality of objects (gas station, restaurant, department store, bank, theater, etc.). The objects may be provided with location information. If the map data is updated, the map provision server 300 notifies the mobile terminal 100 of the map data update and transmits the updated map data to the mobile terminal 100 in response to an update command. In the case that the mobile terminal 100 does not store the map data, the map data provision server 300 may transmit the map data to the mobile terminal 100 in response to a map data provision request. At this time, the map provision server 300 receives the current location information of the mobile terminal 100 and transmits the map data of the area based on the current location information of the mobile terminal 100. The map provision server 300 may process the map data in response to the command such as location change and zoom-in/out commands and sends the processed map data to the mobile terminal 100 back.

The application provision server 200 may provide a plurality of applications that can be installed in the mobile terminal. The application provision server 200 may store various applications. Particularly, in one embodiment of the present disclosure, the application provision server 200 may provide an application including the location information (latitude, longitude, and address information) and the menu information of the applications. The location information and menu information may be included in a manifest file of the application.

The application provision server 200 may receive a location range of the map area displayed on the screen from the mobile terminal 100. The application provision server 200 may search for the applications having the information related to a location situated within the location range of the map area currently displayed. The application provision server 200 may send the at least one piece of application-related information (such as, for example, an icon, application name, location information, or brief summary of information) discovered as a result of the search to the mobile terminal 100. The application provision server 200 may thus transmit information on the installed applications and the non-installed application. In order to accomplish this, the application server 200 may receive information on the all applications stored in the mobile terminal 100 from the mobile terminal 100, and compare the installed application information and the discovered application information, thereby differentiating between the installed and non-installed applications. The application provision server 200 may then receive the information on the applications having information on the location, and compare the received application information with the discovered application information to differentiate between the installed applications and non-installed application. The installed and non-installed applications may be sorted at the mobile terminal 100. The application provision server 200 transmits the information on the all found applications to the mobile terminal 100.

If an install (or download) request is received from the mobile terminal 100, the application provision server 200 may transmit install information of the requested application. If the application information fails to include location information in the request, the application provision server 200 checks the location information of the application indicated by the application information, and sends the location information of the application to the mobile terminal 100.

The mobile terminal 100 may displays a reduced scale map in response to a map display request. At this time, the mobile terminal 100 displays the map around the current position or the most recently displayed map. The map received from the map provision server 300 is stored and, if desired, updated. The mobile terminal 100 may also not store the map data but stream the map data from the map provision server 300 whenever the map display request is input.

The mobile terminal 100 checks the location range of the displayed map and presents the applications having corresponding location information. Icons may be used to designate a location within the location range of the display map. The mobile terminal 100 may present the installed applications and non-installed application distinctly from one another. To extrapolate further, the mobile terminal 100 compares the location information of the installed applications and the location range of the displayed map to retrieve installed applications to be presented on the map. The mobile terminal 100 also may receive the information on non-installed applications from the application provision server 200. To do so, the mobile terminal 100 sends the application provision server 200 the information on the location range of the displayed map, and the information on currently installed applications. The application provision server 200 then transits information related to only the non-installed applications. The mobile terminal 100 also may send the application provision server 200 the location range of the map and the information on all of the installed application, and receive in response information on installed and non-installed applications having the location information indicating the same location range. The application information may include, for example, an application name, an application location, or an icon. The mobile terminal 100 may receive the non-installed application information along with a brief description about each non-installed application. The brief descriptions may help the user determine whether to install each non-installed application.

The mobile terminal 100 also may send the application provision server 200 the location range of the currently displayed map area, receive in response information on the applications having location information corresponding to the location information of the displayed map area from the application provision server 200, compare the received application information and the application information of all installed applications, and present the installed and non-installed applications distinctly from one another. That is, the mobile terminal 100 compares the received application information with the installed application information and identifies applications having matching information as installed applications, and the applications having no matching information as non-installed applications. The applications may then be presented distinct from one another on the map, in the forms of icons.

If a first type selection (e.g., a standard touch-based input) is detected on an application icon presented on the map, the mobile terminal 100 may execute the application represented by the selected application icon. At this time, the mobile terminal 100 may check the corresponding location information, and execute a function (or a menu) associated with the location information among the functions (or menus) of the application.

If the selected application icon indicates a non-installed application, the mobile terminal 100 may connect to the application provision server 200 to download the corresponding application. If the download (or install) request is detected, the mobile terminal 100 downloads the application from the application provision server 200 and installs the application.

If a second type selection (e.g., a "long touch" touch-based input) is detected on an application icon presented on the map, the mobile terminal 100 may display a menu list presenting function options or items provided by the application represented by the selected application icon. The mobile terminal 100 may execute a function that is selected from the menu list. If the selected application icon is of the non-installed application, the mobile terminal 100 may connect to the application provision server 200 to download the corresponding application. Afterward, if a download (or install) request is detected, the mobile terminal 100 may download the application from the application provision server 200 and install the downloaded application.

The mobile terminal 100 may present the applications in the form of a group icon. If the group icon is selected (touched), the mobile terminal 100 may display a popup window including the individual icons representing the applications belonging to the group. The mobile terminal 100 may zoom in the map to present the icons included in the group independently. The group icon may include the installed application icons and non-installed application icons, presented distinctively from one another. If the first type selection or second type selection is detected on one of the icons included in the group icon or presented in the popup window, the mobile terminal 100 may execute the same operation when the first type selection or second type selection is detected on the application icon presented on the map.

Figure 2:
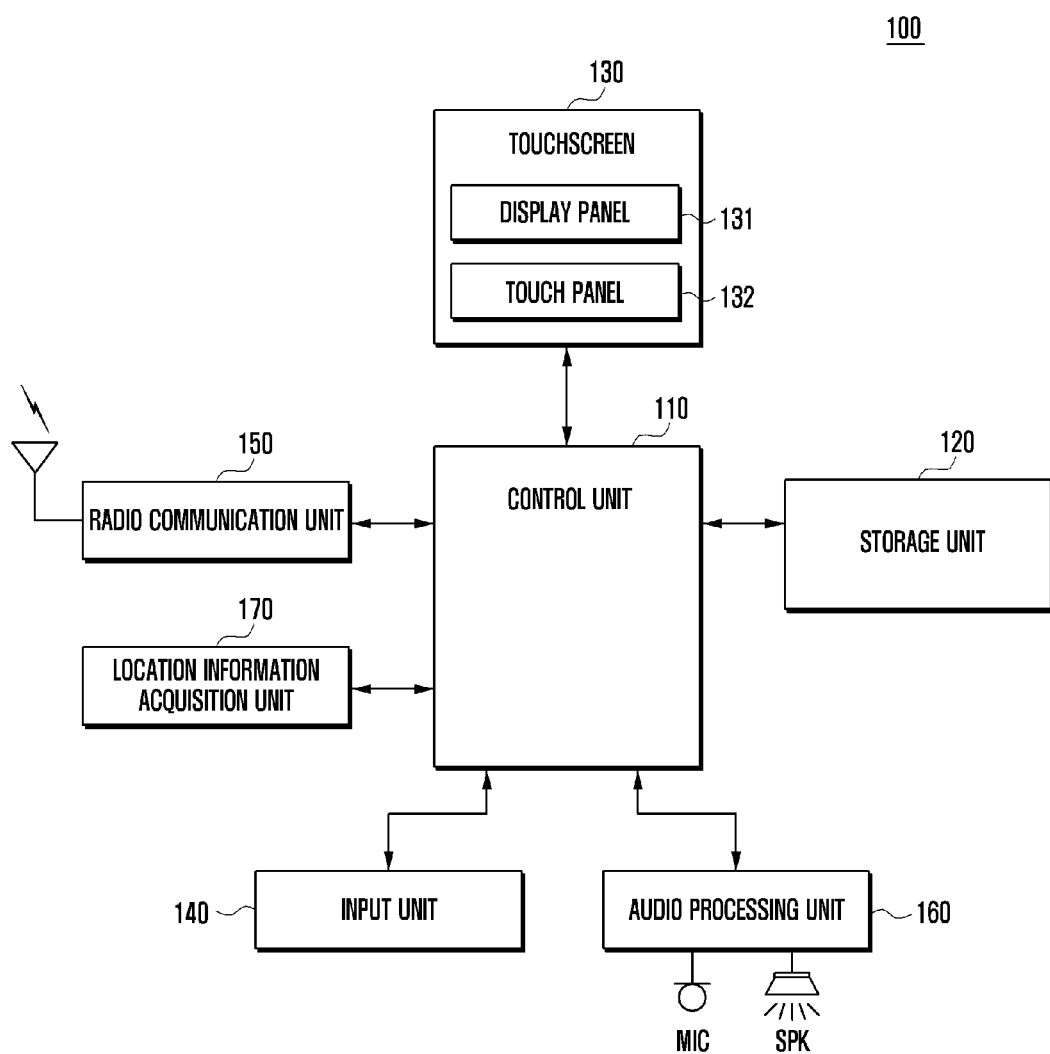
FIG. 2 is a block diagram illustrating a configuration of the mobile terminal according to an embodiment of the present disclosure.

FIG. 2 is a block diagram illustrating a configuration of the mobile terminal according to an embodiment of the present disclosure.

As shown in FIG. 2, the mobile terminal 100 according to an embodiment of the present disclosure includes a control unit 110, a storage unit 120, a touchscreen 130, an input unit 140, a radio communication unit 150, an audio processing unit 160, and a location information acquisition unit 170.

The audio processing unit 160 connects to a speaker (SPK) which outputs the audio signals transmitted/received in, for example, a telephony mode, signals included in a received message, signals decoded while playing audio files stored in the storage unit 120; and audio signals received from a microphone (MIC) which collects user speech and other audio signals. The audio processing unit 160 may output various sound effects through the speaker (SPK), the sound effects associated with the operations of the mobile terminal 100, such as application display, execution, and installation.

The input unit 140 includes a plurality of input keys for receiving alphanumeric input and function keys for configuring various functions. The function keys may be implemented in the form of navigation keys, side keys, and shortcut keys designated for specific functions. The input unit 140 generates key signals for user setting and function control of the mobile terminal 100 to the control unit 110. The input unit 140 may be implemented with at least one of QWERTY keypad, 3*4 keypad, 4*3 keypad, ball joystick, optical joystick, wheel key, touch key, touchpad, and touchscreen. In the case that a full touchscreen is embedded in the mobile terminal 100, the input unit 140 may include a reduced number of function keys such as volume keys, power key, menu key, cancel key, and home key. Particularly in an embodiment of the present disclosure, the input unit 140 may generate various input signals associated with the applications presentation, e.g. map application execution request signal, map zoom-in/out request signal, signal for executing an application represented by an icon presented on the map, and a non-installed application download and install request signal to the control unit 110.

The location information acquisition unit 170 is capable of checking the current location of the mobile terminal 100 in various ways. For example, the location information acquisition unit 170 may check the current location of the mobile terminal 100 by means of one of Global Positioning System (GPS), Global Navigation Satellite System (GNSS), and GALILEO. The location information acquisition unit 170 is capable of computing the current location of the mobile terminal through triangulation based on the radio signals received from a plurality of base stations, e.g. more than 3 base stations. The location information acquisition unit 170 is also capable of calculating the current location of the mobile terminal 100 using the adjacent Access Points of which locations are obvious. Since such location positioning methods are well-known to those skilled in the art, detailed description thereon is omitted herein.

The radio communication unit 150 is responsible for the radio communication function of the mobile terminal 100 and, if the mobile terminal 100 supports cellular communication function, includes a cellular communication module. The radio communication unit 150 may include a Radio Frequency (RF) transmitter (not shown) for up-converting and amplifying the transmission signal and an RF receiver (not shown) for low noise amplifying and down-converting the received signal. Particularly, in an embodiment of the present disclosure, the radio communication unit 150 may transmit the location range to the application provision server 200 and receive information on the application having location information corresponding to the location range from the application provision server 200. The radio communication unit 150 may request the application provision server 200 to transmit the location information of applications having no location information, selected from among the applications installed in the mobile terminal 100 under the auspices of the control unit 110. The radio communication unit 150 also may receive the map data and the update data for updating the map data from the map provision server 300.

The touchscreen 130 may work as both an input and an output means. The touchscreen 130 may include a display panel 131 and a touch panel 132.

The display panel 131 displays the information input by and presented to the user as well as various menus of the mobile terminal 100. The display panel 131 may be implemented with one of Liquid Crystal Display (LCD), Organic Light Emitting Diode (OLED), or Active Matrix OLED (AMOLED). The display panel 131 may display various operation screens including a home screen, menu screen, webpage screen, call processing screen, etc. Particularly, in an embodiment of the present disclosure, the display panel 131 may display application presentation function-related screens such as a map screen having application icons and application group icons, application execution screen, and non-installed application download and configuration screens. The screens that can be displayed by the display panel 131 are described with reference to example screen displays later below.

The touch panel 132 is responsible for input function generating an input signal to the control unit 110 in response to a touch gesture with a touch means such as finger, stylus, and electronic pen. In detail, the touch panel 132 detects a touch gesture based on the change in physical quantity (e.g. capacitance and resistance) which is caused by the touch or proximity of a touch input means and sends the information on the touch type (such as tap, drag, flick, long touch, double touch, and multi-touch) and position to the control unit 110. Since the touch panel 132 is well-known to those skilled in the art, detailed description thereon is omitted herein. Particularly in an embodiment of the present disclosure, the touch panel 132 is capable of generating various touch signals for controlling the applications presentation process to the control unit 110. The touch signals are described with reference to the example screen displays later.

The storage unit 120 stores an Operating System (OS) of the mobile terminal 100 and application programs responsible for optional functions such as audio playback function, still and motion picture playback function, broadcast playback function, Internet access function, text messaging function, and map service function. The storage unit 120 also may store various application data such as video data, game data, audio data, movie data, and map data. Particularly in an embodiment of the present disclosure, the storage unit 120 may store the installed applications having location information. Installed applications may include a Manifest file including location information and menu information. The Manifest file may be exemplified as shown in table 1.

TABLE 1

<Map type=position>36.259081, 127.044408</Map>
<Map type=position>32.232672, 128.128287</Map>
<Map type=address> Samsung Electronics, Maetan-dong, yeongtong-gu, suwon-si, gyeonggi-do </Map>
<Map type=menu language= "kor/KR "> "ticket booking" </Map>
<Map type=menu language= "kor/KR "> "currently running movie" </Map>

Referring to table 1, the Manifest file includes the location information (such as latitude, longitude, and address), movie ticket booking menu, currently running movie menu.

The storage unit 120 may store the non-installed application icon, application name, location information, and summary information. The storage unit 120 may store the reference value for displaying a plurality of icons in the form of a group icon. The reference value may be the distance between application icons on the screen (e.g., 1 cm). For example, the application icons arranged in the range of 1 cm on the screen may be displayed as a group. The reference value may be a cell. For example, the map may be divided into a predetermined number of cells (e.g., 20*10 cells in landscaped mode), and the icons within a cell can be presented in the form of a group icon.

The control unit 110 controls the overall operations of the mobile terminal 100 and the signal flows among the components of the mobile terminal 100 and processes data. The control unit 110 may include a Central Processing Unit (CPU) and Application Processor (AP). The control unit 110 may be implemented with a single core processor or multi-core processor. The control unit 110 may present the installed and/or non-installed applications at the corresponding position on the map and to execute and install the presented applications. The detailed description on the operations of the control unit 110 is made with reference to FIGS. 3 to 9.

Although not depicted in FIG. 2, the mobile terminal 100 may further include supplementary function modules such as a camera module for use in still and motion picture shooting and video call, a broadcast reception module for receiving broadcast signal, a digital music player module (e.g. MP3 module), and Internet access module (e.g. Wi-Fi communication module). Although it is difficult to enumerate all of the components that can be implemented in the mobile terminal 100, the mobile terminal 100 according to an embodiment of the present disclosure can be implemented with or without at least one of aforementioned functional components and their equivalent devices.

Figure 3:
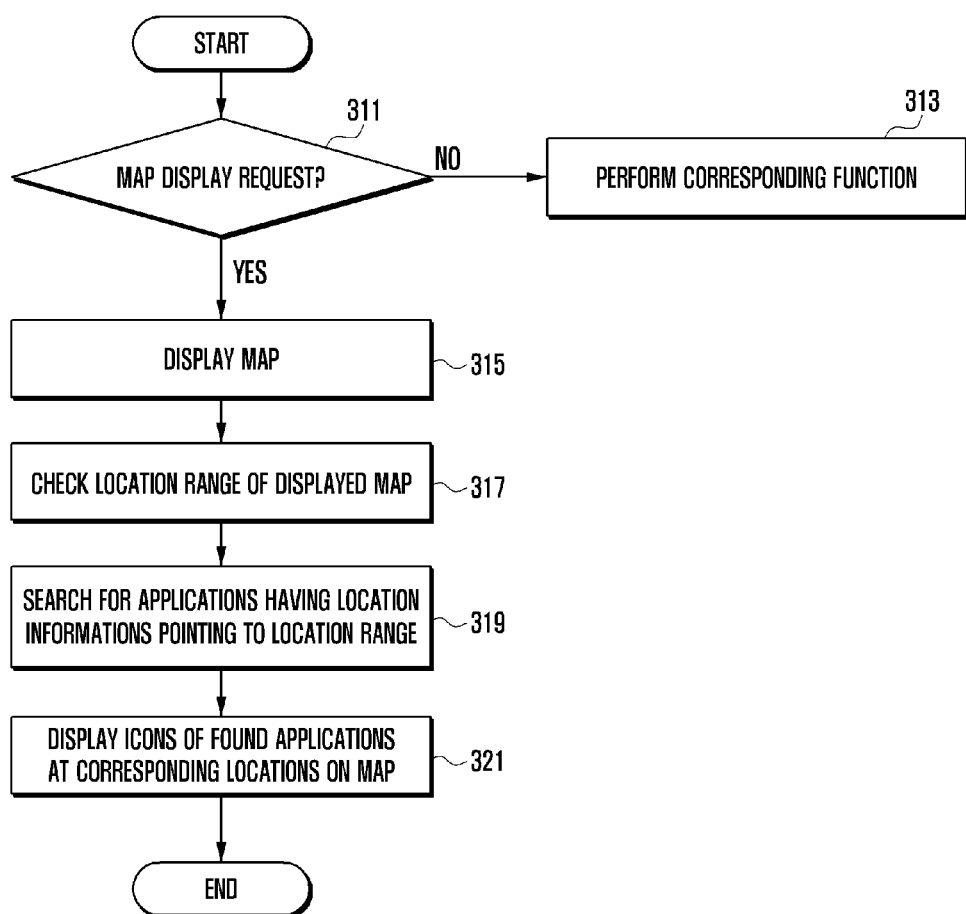
FIG. 3 is a flowchart illustrating an application presentation procedure of the mobile terminal according to an embodiment of the present disclosure.
Figure 4:
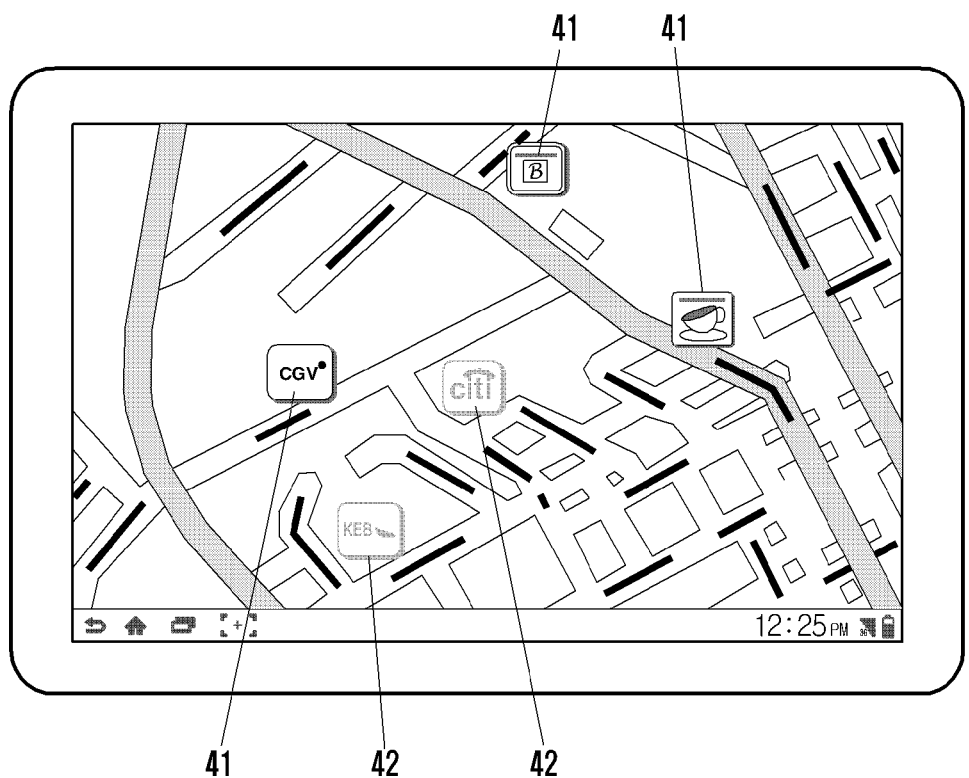
FIG. 4 is a diagram illustrating example screen displays for use in conjunction with the procedure of FIG. 3.
Figure 5:
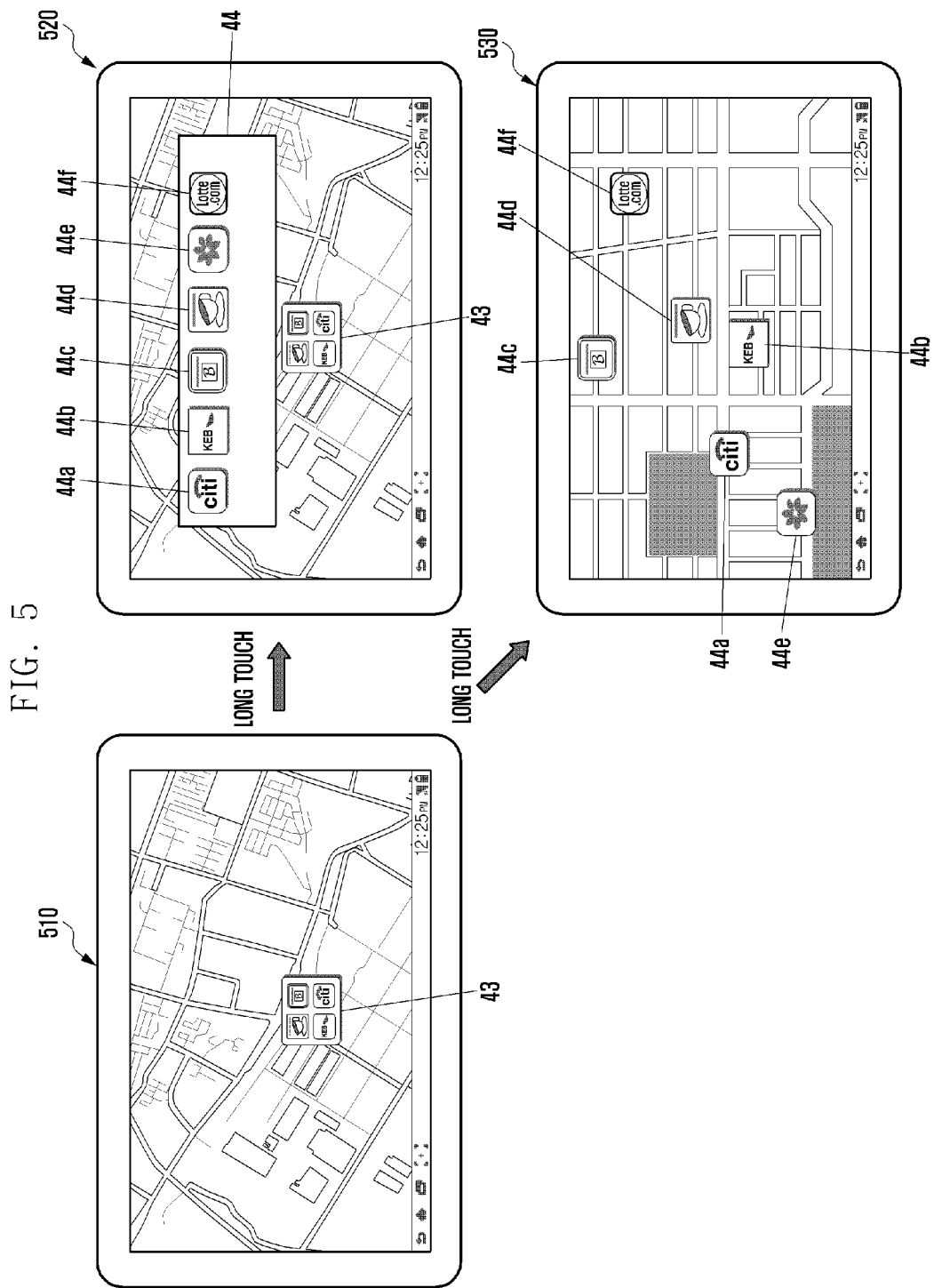
FIG. 5 is a diagram illustrating example screen displays for use in conjunction with the procedure of FIG. 3.

FIG. 3 is a flowchart illustrating an application presentation procedure of the mobile terminal according to an embodiment of the present disclosure, and FIGS. 4 and 5 are diagrams illustrating example screen displays for use in conjunction with the procedure of FIG. 3.

Referring to FIGS. 3 to 5, according to an embodiment of the present disclosure, the control unit 110 of the mobile terminal 100 detects a user input and determines whether the user input is a map display request at operation 311. The map display request may be detected even when the map application is running. If the user input is not the map display request, the control unit 110 may perform another function corresponding to the user input at operation 313. For example, the control unit 110 may execute the audio playback function, Internet access function, or video play back function, or enter the idle state.

If the user input is a request for a map display, the control unit 110 displays the map at operation 315. At this time, the control unit 110 may check the current location of the mobile terminal 100 based on the information provided by the location information acquisition unit 170 and display the map scaled at a certain level around the current location. The control unit 110 may display the map most recently displayed by the user. The scale may be set to a default value, or follow a scale used most recently by the user.

The control unit 110 checks the location range of the currently displayed map at operation 317. The control unit 110 searches for the applications having the location information corresponding to the location range of the map at operation 319. The location information may include at least one of latitude, longitude, and address. A search may be conducted for the applications installed in the mobile terminal 100 (hereinafter, referred to as an "installed application") and the applications which have not been installed in the mobile terminal 100 (hereinafter, referred to as a "non-installed application"). The non-installed application search may be performed with the assistance of the application provision server 200.

The control unit 110 compares the location information of the previously installed applications with the location range of the currently displayed map to retrieve the installed applications. The control unit 110 may send the application provision server 200 the location range of the currently displayed map area and the information on all installed applications, or information pertaining to the installed applications having the location information corresponding to the current location range, thereby allowing the application provision server 200 to determine and transmit the information on the non-installed applications from the application provision server 200.

In another approach, the mobile terminal 100 may send the application provision server 200 the location range of the currently displayed map area, and receive from the application provision server 200 the information on applications having the location information corresponding to the current location range of the map area. The installed applications and non-installed applications may be sorted by the mobile terminal 100 or the application provision server 200. When the mobile terminal 100 sorts the applications into the installed and non-installed applications, the control unit 110 compares the received application information and the informations of all applications installed in the mobile terminal 100 to discriminate between installed and non-installed applications. That is, the control unit 110 compares the application information received from the application provision server 200 and the information on the applications installed in the mobile terminal, and identifies the applications having matching information as installed applications, and the applications having no matching information as non-installed applications. When the application provision server 200 sorts the applications into the installed and non-installed applications, the application provision server 200 receives the information on the installed application from the mobile terminal 100 along with the location range of the map or manages the application download, and installation history of the mobile terminal 100.

When the application search has completed, the control unit 110 presents the icons representing the retrieved applications at the corresponding position on the currently displayed map at operation 321. At this time, the control unit 110 may present the installed and non-installed application icons distinctly. As shown in the example display of FIG. 4, the map includes a plurality of objects. The control unit 110 compares the location information of each object with the location information of each application and presents the icon for each of the applications around each of the objects matching the location information. The control unit 110 presents the icons 41 of the installed applications at a first brightness level and the icons 42 of the non-installed applications at a second brightness level. This is an example case, but the present disclosure is not limited thereto. For example, the installed and non-installed application icons 41 and 42 may be presented in other visually discrete manners.

The control unit 110 may present the application icons positioned within a predetermined range on the map in the form of a group icon. As shown in the example screen display 510 of FIG. 5, the control unit 110 groups the applications icons positioned within an area into a group icon 43. At this time, the group icon 43 may be composed of small application icons limited in number. The presented small icons may be the icons of the applications having high priorities (in a most recently-used first, most frequently-used first, or first-installed first order) among the icons belonging to the group. If a first type touch gesture (e.g., a "tap" input gesture) is made to one of the small icons included in the group icon 43, the control unit 110 executes the corresponding application. If a second type touch gesture (e.g., a "long touch" input gesture) is detected on the group icon 43, the control unit 110 displays a popup window 44 presenting the application icons 44a, 44b, 44c, 44d, 44e, and 44f included in the group, as shown in the example screen display 520. Also, when the second type touch gesture (e.g., the long touch) is detected on the group icon 43, the control unit 110 may zoom in the map to present the application icons 441, 44b, 44c, 44d, 44e, and 44f independently in a distributed manner on the map as shown in the example screen display 530.

Whenever the display area of the map changes due to the zoom-in/out and scroll of the map, the control unit 110 performs the procedure of operations 317 and 319.

The control unit 110 may receive the brief description about the non-installed applications along with the application information on the non-installed applications (such as, for example, the application name, location information, or icon). The brief description may be used by the user to determine whether to install the non-installed application.

Although the description is directed to the case where a plurality of icons located within a predetermined range are grouped into a group icon, the present disclosure may be implemented in such a way that when a predetermined number of applications are located within a predetermined range, the applications are presented as a group. At this time, the number of applications may be determined depending on the reduced scale of the map.

Figure 6:
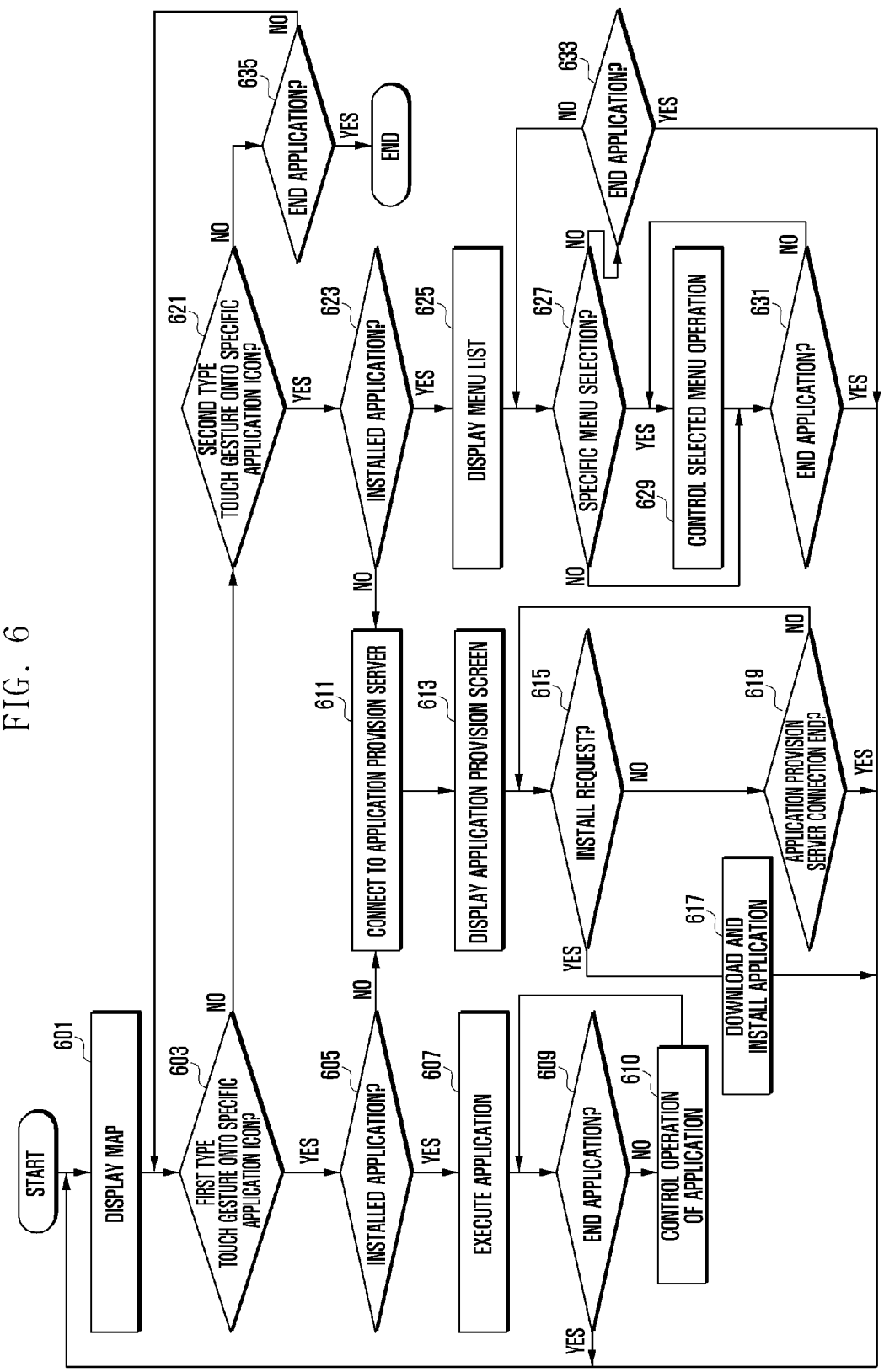
FIG. 6 is a flowchart illustrating an application execution and installation procedure of the mobile terminal according to an embodiment of the present disclosure.
Figure 7:
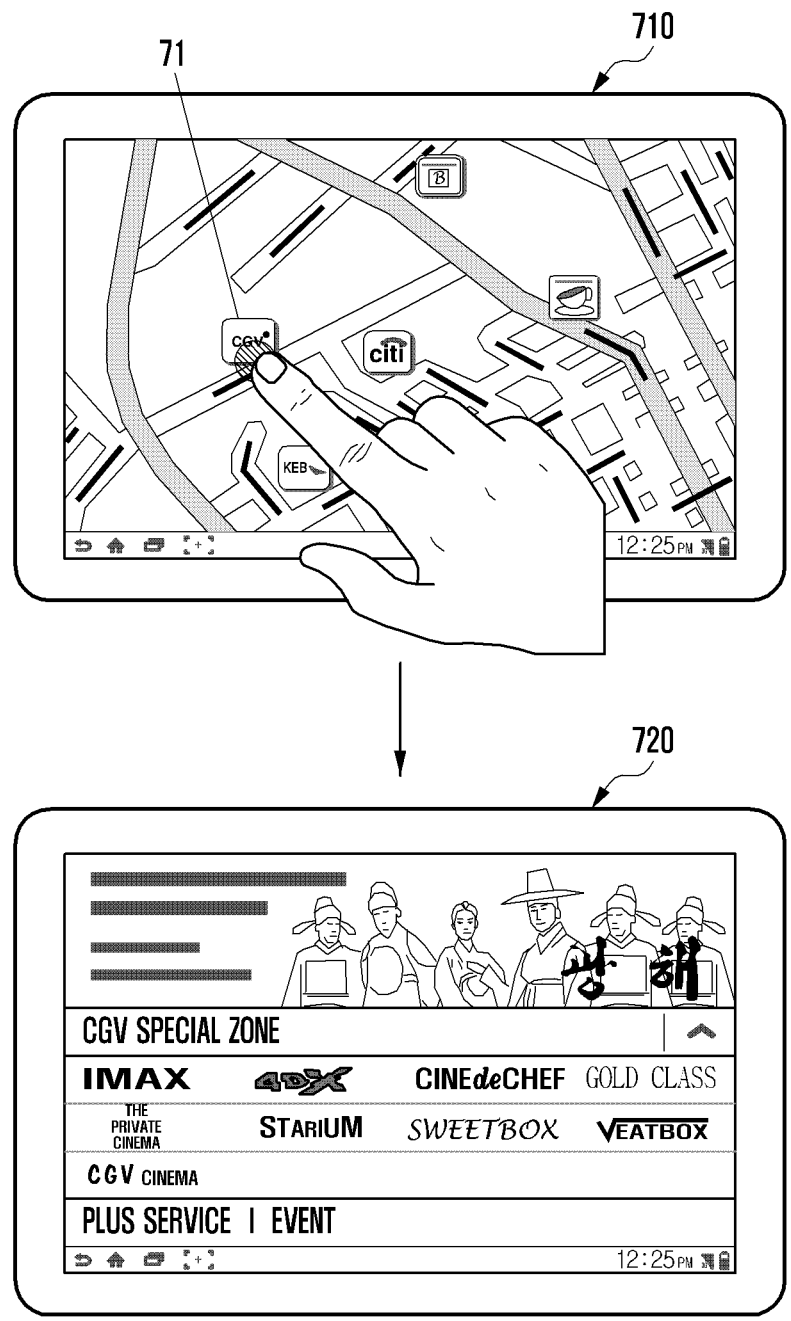
FIG. 7 is a diagram illustrating example screen displays for use in conjunction with the procedure of FIG. 6.
Figure 8:
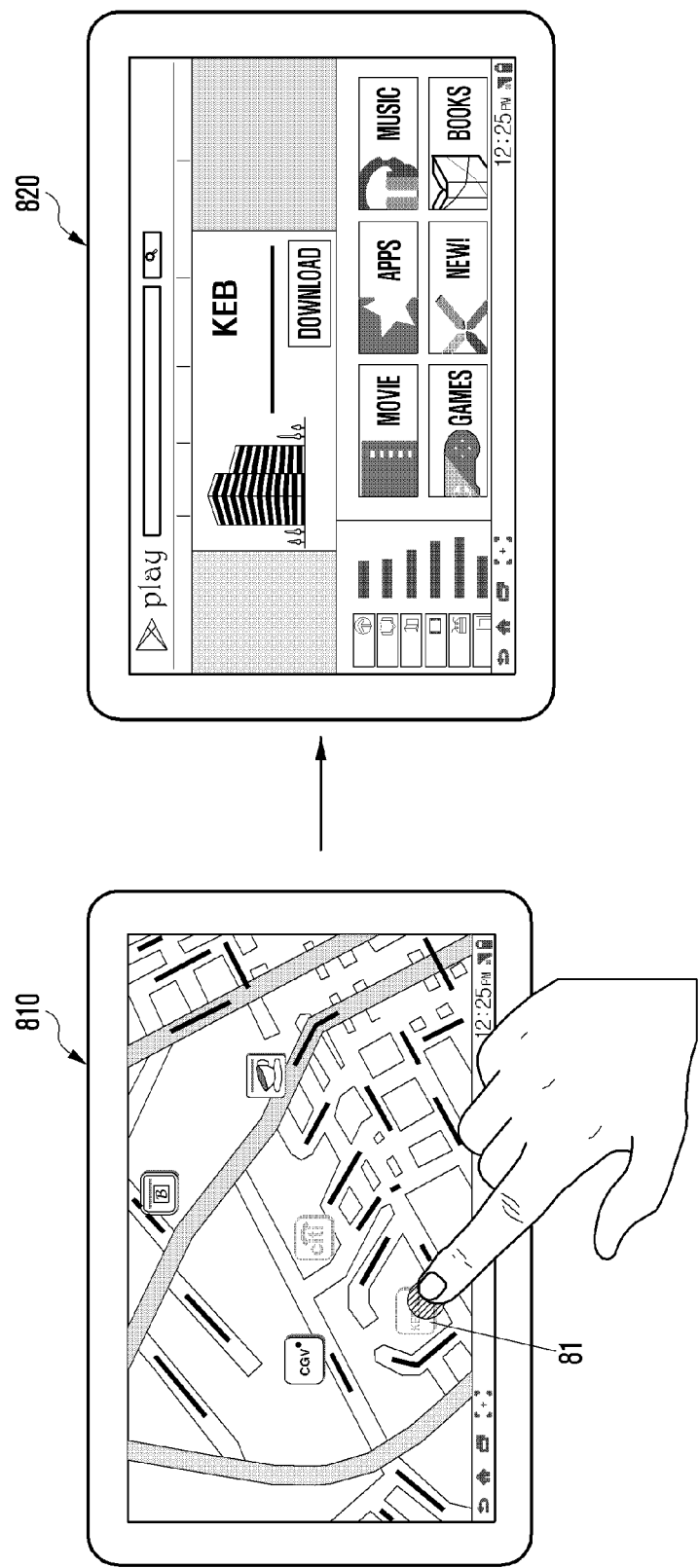
FIG. 8 is a diagram illustrating example screen displays for use in conjunction with the procedure of FIG. 6.
Figure 9:
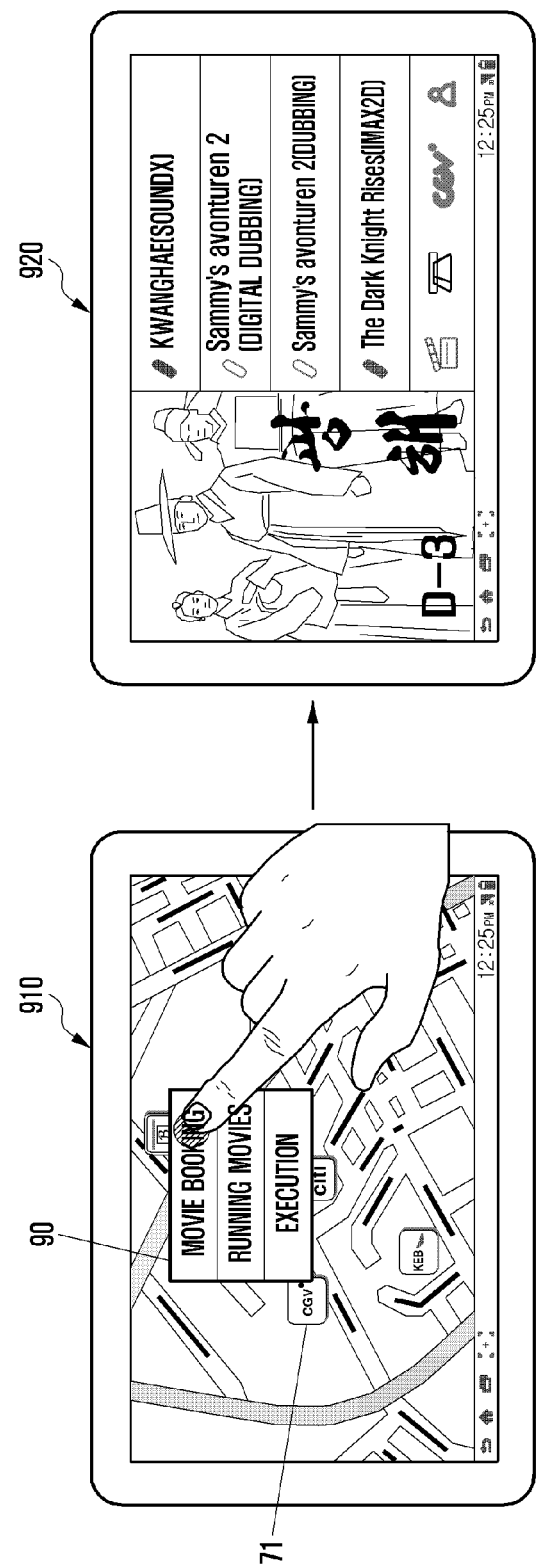
FIG. 9 is a diagram illustrating example screen displays for use in conjunction with the procedure of FIG. 6.

FIG. 6 is a flowchart illustrating an application execution and installation procedure of the mobile terminal according to an embodiment of the present disclosure, and FIGS. 7 to 9 are diagram illustrating example screen displays for use in conjunction with the procedure of FIG. 6.

Referring to FIGS. 6 to 9, according to an embodiment of the present disclosure, the control unit 110 of the mobile terminal 100 displays the map at operation 601. The control unit 110 determines whether a first type touch gesture (e.g. a "tap" gesture) is made to a certain application icon at operation 603. If the first type touch gesture made to a certain application icon is detected, the control unit 110 determines whether the application icon is of an installed application at operation 605. If the application icon is of an installed application icon, the control unit 110 executes the application represented by the icon at operation 607. If the first type touch gesture (e.g. the "tap") is made to the theater icon 71 as shown in the example screen display 710 of FIG. 7, the control unit 110 executes the theater application represented by the theater icon 71 and controls the display panel 131 to display the execution screen of the theater application as shown in the example screen display 720 of FIG. 7.

Next, the control unit 110 determines whether an application end signal is detected at operation 609. If the application end signal is detected, the control unit 110 returns the procedure to operation 601. Otherwise, if no application end signal is detected, the control unit 110 continues controlling the operation of the application at operation 610 until the application end signal is detected.

If the application icon is not of the installed application at operation 605, the control unit 110 connects to the application provision server 200 at operation 611 and controls the display panel 131 to display an application presentations screen at operation 613. For example, referring now to FIG. 8, if the first type touch gesture (e.g. the "tap") is made to a bank icon 81 representing a bank application as one of the non-installed applications as shown in the example screen display 810, the control unit 110 controls to display the applications presentation screen as shown in the example screen display 820. Although the description is directed to the case where the mobile terminal 100 connects to the application provision server 200 immediately upon detection of the first type touch gesture onto the non-installed application, the present disclosure may be implemented so that a popup window may query the user as to whether connection to the application provision server 200 is desirable, when the first type touch gesture is detected onto a non-installed application icon.

Next, the control unit 110 determines whether an install request is detected at operation 615. If the install request is detected, the control unit 110 downloads and installs the application at operation 617. If the application is installed successfully, the control unit 110 returns the procedure to operation 601. If no install request is detected at operation 615, the control unit 110 determines whether a server connection end request is detected at operation 619. If the server connection end request is detected, the control unit 110 returns the procedure to operation 601 and, otherwise no server connection end request is detected, continues monitoring to detect the install request at operation 615.

If not first type touch gesture (e.g. the "tap") is made to a certain application icon at operation 603, the control unit 110 determines whether a second type touch gesture (e.g. a "long touch") is made to a certain application at operation 621. If the second type touch gesture made to a certain application is detected, the control unit 110 determines whether the application icon is of an installed application at operation 623. If the application icon is not of the installed application, the procedure goes to operation 611. Otherwise if the application is of an installed application, the control unit 110 controls to display a menu list presenting executable menu items at operation 625. In order to accomplish this, the executable items are included in the Manifest file of the specific icon.

The control unit 110 determines whether a certain menu item is selected from the menu at operation 627. If a certain menu item is selected at operation 627, the control unit 110 controls to execute the selected menu item at operation 629. For example, referring to FIG. 9, if the second type touch gesture (e.g. the "long touch") is detected at the theater icon 71, the control unit 110 displays a menu window 90 listing executable menu item as shown in the example screen display 910 of FIG. 9. If the movie tick booking menu item is selected (touched) in the menu window 90, the control unit 110 controls the display panel 131 to display the movie ticket booking screen as shown in the example screen display 920. The user may book a movie on the movie ticket booking screen.

The control unit 110 determines whether an application end signal is detected at operation 631. If no application end signal is detected, the control unit 110 continues controlling the operation of the application at operation 629 until the application end signal is detected and, otherwise if the application end signal is detected, returns the procedure to operation 601.

Meanwhile, if no menu item is selected at operation 627, the control unit 110 determines whether an application end signal is detected at operation 633. If no application end signal is detected, the procedure goes to operation 627 and, otherwise if the application end signal is detected, operation 601.

If no second type touch gesture (e.g. a "long touch") made to a certain application is detected, the control unit 110 determines whether a map display end request is detected at operation 635. If no map display end request is detected, the control unit 110 returns the procedure to operation 603. Otherwise if the map display end request is detected, the control unit 110 ends by displaying the map.

As described above, the applications presentation method and system of the mobile terminal according to the present disclosure provides the user with information on the applications installed and/or capable of being installed in association with the position located on the map in a location-based manner. The application presentation method and system of the present disclosure provides the information on the location-based applications efficiently, resulting in more convenient application usability.

Also, the applications presentation method and system of the mobile terminal according to the present disclosure allows location-based applications provide the user with location-based menus of the application situated at the position located on the map, improving user convenience.

The applications presentation method and system of the mobile terminal according to the present disclosure allows the mobile terminal to present the location-based applications at a location on the map, and prompt the user to download and install the applications selectively. This makes it possible for the application provider to increase application download count.

The above-described applications presentation method of a mobile terminal according to an embodiment of the present disclosure can be implemented in the form of computer-executable program commands and stored in a computer-readable storage medium. The computer readable storage medium may store the program commands, data files, and data structures in individual or combined forms. The program commands recorded in the storage medium may be designed and implemented for various example embodiments of the present disclosure or used by those skilled in the computer software field. The computer-readable storage medium includes magnetic media such as a floppy disk and a magnetic tape, optical media including a Compact Disc (CD) ROM and a Digital Video Disc (DVD) ROM, a magneto-optical media such as a floptical disk, and the hardware device designed for storing and executing program commands such as ROM, RAM, and flash memory. The programs commands include the language code executable by computers using the interpreter as well as the machine language codes created by a compiler. The aforementioned hardware device can be implemented with one or more software modules for executing the operations of the various example embodiments of the present disclosure.

Although the applications presentation method and system of a mobile terminal according to optional embodiments of the disclosure have been described using specific terms, the specification and drawings are to be regarded in an illustrative rather than a restrictive sense in order to help understand the present disclosure. It is obvious to those skilled in the art that various modifications and changes can be made thereto without departing from the range of the disclosure.

Any of the functions and steps provided in the Figures may be implemented in hardware, software or a combination of both and may be performed in whole or in part within the programmed instructions of a computer. No claim element herein is to be construed and er the provisions of 35 U.S.C. 112, sixth paragraph, unless the element is expressly recited using the phrase "means for."

The functions and process steps herein may be performed automatically or wholly or partially in response to user command. An activity (including a step) performed automatically is performed in response to executable instruction or device operation without user direct initiation of the activity.

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. §101 and does not constitute software per se.

What is claimed is:

1. An applications presentation method for a mobile terminal, the method comprising:
   displaying, a map on a display when a map application is executed, the map scaled to a location range;
   searching via a processor for installed applications having location information corresponding to the location range among a plurality of applications stored in the mobile terminal;
   transmitting information identifying at least the location range and the installed applications to an application provision server;
   receiving information on non-installed applications having the location information corresponding to the location range from the application provision server;
   displaying icons including icons of the installed applications and icons of the non-installed applications on the map; and
   in response to detecting a single touch gesture to one of the displayed icons, executing one of a plurality of functions depending on a type of the detected touch gesture and an installation status of an application corresponding to the one of the displayed icons, the plurality of functions including at least:
   when the installation status indicates the corresponding application is installed and the type is a first type of contact-based touch gesture, transitioning the map from display to display execution of the corresponding application,
   when installation status indicates the corresponding application is installed and the type is a second type of contact-based touch gesture different from the first type, retrieving selectable options for the corresponding application and display the selectable options as a pop-up menu over the displayed map;
   wherein the information on non-installed applications comprises an application name, application location information, and application icon,
   wherein the first type of contact-based touch gesture is a tap, and the second type of contact-based touch gesture is a long-touch, and
   wherein when the installation status indicates the corresponding application is uninstalled, transitioning the map from display to display execution of an application store program from which the corresponding application is retrievable from the application provision server.

2. The method of claim 1, wherein displaying the icons comprises visually differentiating between the icons of the installed applications and icons of the non-installed applications, and
   wherein execution and display of the application store program includes displaying a screen including an image representing the corresponding application and a graphic selectable to initiate download and installation of the corresponding application from the application provision server.

3. The method of claim 1, further comprising:
   requesting from the application provision server location information of installed applications that have no location information; and
   receiving the requested location information.

4. The method of claim 1, wherein displaying the icons comprises grouping the icons of the installed applications and the icons of the non-installed applications into a group icon when the icons are situated within a predetermined range of one another,
   wherein display of the group icon includes less than a totality of the grouped icons by excluding some of the grouped icons from display.

5. The method of claim 4, wherein the predetermined range is one of a distance between each icon, and a cell of a plurality of cells of the map displayed on the display.

6. The method of claim 4, wherein the grouping the icons comprises grouping icons into the group icon when a number of icons arranged within the predetermined range is equal to or greater than a predetermined threshold value, the threshold value dependent upon a reduced scale of the map.

7. The method of claim 4, wherein the group icon is presented at a position associated with a priority application having highest priority among applications represented by icons included in the group icon.

8. The method of claim 1, further comprising:
   detecting a touch gesture of a second type different from a first type on an application icon presented on the map, wherein:
   when the application icon is associated with one of the installed applications, display a menu associated with the one of the installed applications listing executable menu items, and execute a function of one of the executable menu items when selected, and
   when the application icon is associated with one of the non-installed applications, transmit a request for the one of the non-installed applications to the application provision server.

9. The method of claim 1, wherein when the detected touch gesture to one of the displayed icons of the map is the second type, and
   wherein the one of the displayed icons is a group icon representing multiple displayable icons,
   altering display of the map further in response to detecting the single touch gesture of the second type comprises removing the group icon from display and automatically zooming the map to a zoom level in which a totality of the multiple displayable icons of the group icon are individually displayed, such that each respective icon of the multiple displayable icons is disposed at a corresponding geographic position within the map.

10. The method of claim 1, wherein location information and menu information are included in a Manifest file of each of the installed applications.

11. The method of claim 1, wherein the location information comprises at least one of a latitude coordinate, a longitude coordinate, and an address.

12. The method of claim 1, wherein executing the installed application comprises:
identifying a current location of the mobile terminal; and
executing a menu associated with the identified current location that is provided by one of the installed applications.

13. An electronic device for presenting applications, comprising:
a display configured to display a map, the map displaying a location range; and
a processor configured to:
search for installed applications having location information corresponding to the location range among a plurality of applications stored in the electronic device,
transmit information identifying at least the location range and the installed applications to an application provision server;
receive information on non-installed applications having the location information corresponding to the location range from the application provision server;
display icons on the map, the icons including icons of the installed applications and icons of the non-installed applications; and
in response to detecting a single touch gesture to one of the displayed icons, executing one of a plurality of functions depending on a type of the detected touch gesture and an installation status of an application corresponding to the one of the displayed icons, the plurality of functions including at least:
when the installation status indicates the corresponding application is installed and the type is a first type of contact-based touch gesture, transitioning the map from display to display execution of the corresponding application,
when the installation status indicates the corresponding application is installed and the type is a second type of contact-based touch gesture different from the first type, retrieving selectable options for the corresponding application and displaying the selectable options as a pop-up menu over the displayed map;
wherein the information on non-installed applications comprises an application name, application location information, and application icon,
wherein the first type of contact-based touch gesture is a tap, and the second type of contact-based touch gesture is a long-touch, and
wherein when the installation status indicates the corresponding application is uninstalled, transitioning the map from display to display execution of an application store program from which the corresponding application is retrievable from the application provision server.

14. The electronic device of claim 13, wherein displaying the icons comprises visually differentiating between the icons of the installed applications and the icons of the non-installed applications, and
wherein execution and display of the application store program includes displaying a screen including an image representing the corresponding application and a graphic selectable to initiate download and installation of the corresponding application from the application provision server.

15. The electronic device of claim 13, the processor further configured to:
request from the application provision server location information of installed applications that have no location information; and
receive the requested location information.

16. The electronic device of claim 15, wherein the processor is further configured to:
group the icons of the installed applications and the icons of the non-installed applications into a group icon when the icons are situated within a predetermined range of one another,
wherein display of the group icon includes less than a totality of the icons by excluding some of the icons from display, and
wherein the predetermined range is one of a distance between each icon, and a cell of a plurality of cells of the map displayed on the display.

17. The electronic device of claim 16, wherein the processor is configured to:
group icons into the group icon when a number of icons arranged within the predetermined
range is equal to or greater than a predetermined threshold value.

18. The electronic device of claim 17, wherein the threshold value is dependent upon a reduced scale of the map.

19. The electronic device of claim 16, wherein the group icon is presented at a position associated with a priority application having highest priority among the applications represented by icons included in the group icon.

20. The electronic device of claim 13, the processor further configured to:
detect a touch gesture of a second type different from the first type on an application icon presented on the map, wherein:
when the application icon is associated with one of the installed applications, display a menu associated with the one of the installed applications listing executable menu items, and execute a function of the menu when selected, and
when the application icon is associated with one of the non-installed applications, transmit a request for the one of the non-installed applications to the application provision server.

21. The electronic device of claim 16, the processor further configured to:
display a popup window including all of icons of the group icon when the touch gesture detected on the group icon is of the second type.

22. The electronic device of claim 13, wherein when the detected touch gesture to one of the displayed icons of the map is the second type, and wherein when the one of the displayed icons is a group icon representing multiple displayable icons,
altering display of the map further in response to detecting the single touch gesture of the second type comprises removing the group icon from display and automatically zooming the map to a zoom level in which a totality of the multiple displayable icons of the group icon are individually displayed, such that each respective icon of the multiple displayable icons is disposed at a corresponding geographic position within the map.

23. The electronic device of claim 13, wherein the location information comprises at least one of a latitude coordinate, a longitude coordinate, and an address.

24. The electronic device of claim 13, wherein the processor is further configured to:
  identify a current location of the electronic device; and
  execute a menu associated with the current location from among the menus provided by one of the installed applications.

25. An applications presentation method for a mobile terminal, the method comprising:
  displaying a map on a display in response to a map display request;
  displaying icons of applications having location information corresponding to a location range of the displayed map, the applications comprising applications installed in the mobile terminal, and non-installed applications capable of being installed in the mobile terminal: and
  in response to detecting a single contact-based touch gesture to one of the displayed icons, executing one of a plurality of functions depending on a type of the detected contact-based touch gesture and an installation status of an application corresponding to the one of the displayed icons, the plurality of functions including at least:
  when the installation status indicates the corresponding application is installed and the type is a first type of contact-based touch gesture, transitioning the map from display,
  when the installation status indicates the corresponding application is installed and the type is a second type of contact-based touch gesture different from the first type, retrieving selectable options for the corresponding application and displaying the selectable options as a pop-up menu over the displayed map;
  wherein the information on non-installed applications comprises an application name, application location information, and application icon,
  wherein the first type of contact-based touch gesture is a tap, and the second type of contact-based touch gesture is a long-touch, and
  wherein when the installation status indicates the corresponding application is uninstalled, transitioning the map from display to display execution of an application store program from which the corresponding application is retrievable from the application provision server.

26. A non-transitory computer-readable storage medium storing a program for executing an applications presentation method of a mobile terminal, the program comprising:
  displaying a map on a display in response to a map display request;
  displaying icons applications having location information corresponding to a location range of the displayed map, the applications comprising applications installed in the mobile terminal, and non-installed applications capable of being installed in the mobile terminal: and
  in response to detecting a single contact-based touch gesture to one of the displayed icons, executing one of a plurality of functions depending on a type of the detected contact-based touch gesture and an installation status of an application corresponding to the one of the displayed icons, the plurality of functions including at least:
  when the installation status indicates the corresponding application is installed and the type is a first type of contact-based touch gesture transitioning the map from display,
  when the installation status indicates the corresponding application is installed and the type is a second type of contact-based touch gesture different from the first type, retrieving selectable options for the corresponding application and displaying the selectable options as a pop-up menu over the displayed map;
  wherein the information on non-installed applications comprises an application name, application location information, and application icon,
  wherein the first type of contact-based touch gesture is a tap, and the second type of contact-based touch gesture is a long-touch, and
  wherein when the installation status indicates the corresponding application is uninstalled, transitioning the map from display to display execution of an application store program from which the corresponding application is retrievable from the application provision server.

* * * * *